(12) United States Patent
Enoch et al.

(10) Patent No.: US 9,140,326 B2
(45) Date of Patent: Sep. 22, 2015

(54) STRUCTURE THAT CAN CHANNEL AN ELASTIC WAVE PROPAGATING IN A PLATE

(75) Inventors: Stéphane Enoch, Marseilles (FR); Mohamed Farhat, Marseilles (FR); Sébastien Guenneau, Marseilles (FR); Alexander Movchan, Liverpool (GB)

(73) Assignees: Centre National de la Recherche Scientifique, Paris (FR); Université Paul Cézanne Aix-Marseille III, Aix en Provence Cedex (FR); University of Liverpool, Liverpool (GB)

( * ) Notice: Subject to any disclaimer, the term of this patent is extended or adjusted under 35 U.S.C. 154(b) by 243 days.

(21) Appl. No.: 13/823,857

(22) PCT Filed: Sep. 13, 2011

(86) PCT No.: PCT/FR2011/052089
§ 371 (c)(1),
(2), (4) Date: Jun. 6, 2013

(87) PCT Pub. No.: WO2012/035252
PCT Pub. Date: Mar. 22, 2012

(65) Prior Publication Data
US 2013/0241123 A1    Sep. 19, 2013

(30) Foreign Application Priority Data
Sep. 15, 2010 (FR) ...................................... 10 03671

(51) Int. Cl.
*F16F 7/00* (2006.01)
*F42D 3/06* (2006.01)
*G10K 11/18* (2006.01)

(52) U.S. Cl.
CPC ... *F16F 7/00* (2013.01); *F42D 3/06* (2013.01); *G10K 11/18* (2013.01)

(58) Field of Classification Search
CPC ................ F16F 7/00; E04B 1/98; F42D 3/06; G10K 11/16; G10K 11/002
USPC .......................... 267/140.5; 89/903; 33/140.5
See application file for complete search history.

(56) References Cited

U.S. PATENT DOCUMENTS

| 8,488,247 B2 * | 7/2013 | Cai et al. ........................ 359/642 |
| 2008/0024792 A1 | 1/2008 | Pendry et al. |
| 2014/0008119 A1 * | 1/2014 | Brandt ........................... 174/382 |

OTHER PUBLICATIONS

Schurig, et al., "Metamaterial Electromagnetic Cloak at Microwave Frequencies", Nov. 10, 206, Science, vol. 314, p. 977-979.*

(Continued)

*Primary Examiner* — Anna Momper
(74) *Attorney, Agent, or Firm* — Panitch Schwarze Belisario & Nadel LLP

(57) ABSTRACT

A structure for bending transversal elastic waves around a zone to isolate of a plate, has an anisotropic Young's modulus and/or a heterogeneous mass density. The wavelengths of the elastic waves to bend are large with respect to the thickness of the plate and small with respect to the other dimensions of the plate. The structure is made by defining a meshing of a peripheral zone surrounding the zone to isolate; dividing the peripheral zone into several elementary rings and several elementary angular sectors; and forming, in each mesh delimited by an elementary angular sector and an elementary ring, a structural element in a material having a Young's modulus and/or a mass density different than those of the material forming the plate, the dimensions of the meshes and of the structural elements in the plane of the plate being less than half the wavelengths of the elastic waves to bend.

12 Claims, 6 Drawing Sheets

(56) References Cited

OTHER PUBLICATIONS

Int'l Search Report and Written Opinion issued Jan. 23, 2012 in Int'l Application No. PCT/FR2011/052089.
Torrent et al, "Acoustic cloaking in two dimensions: a feasible approach," New Journal of Physics, vol. 10, No. 6, pp. 1-21 (2008).
Chen et al, "Acoustic cloaking and transformation acoustics," Journal of Physics D: Applied Physics, vol. 43, pp. 1-14 (2010).
Urzhumov et al, "Acoustic cloaking transformations from attainable material properties," New Journal of Physics, vol. 12, No. 7, pp. 1-21 (2010).
Int'l Preliminary Report on Patentability issued Mar. 19, 2013 in Int'l Application No. PCT/FR2011/052089.

\* cited by examiner

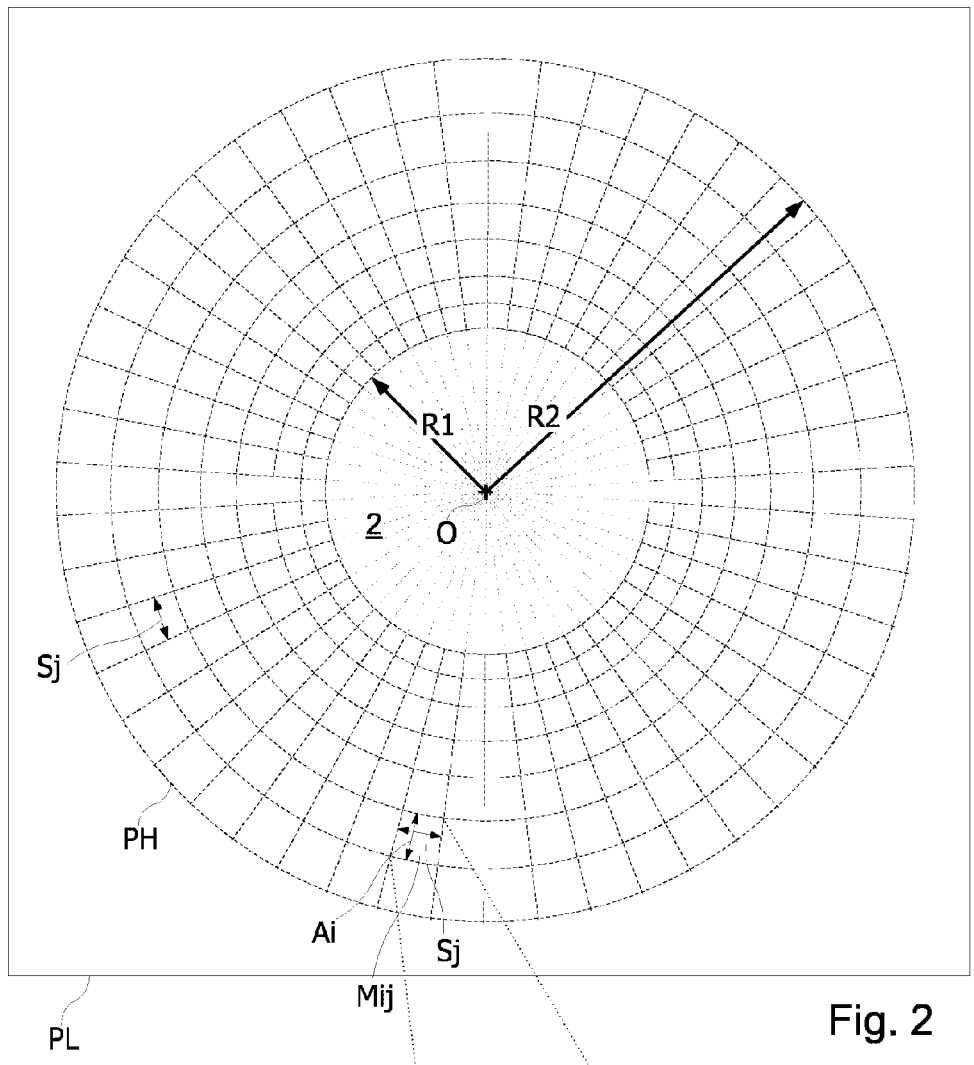
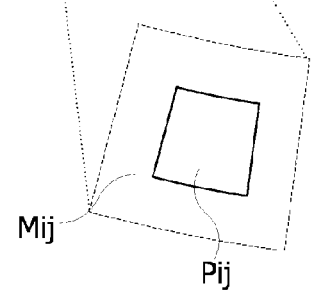
Fig. 2
Fig. 2A

STRUCTURE THAT CAN CHANNEL AN ELASTIC WAVE PROPAGATING IN A PLATE

CROSS-REFERENCE TO RELATED APPLICATIONS

This application is a Section 371 of International Application No. PCT/FR2011/052089, filed Sep. 13, 2013, which was published in the French language on Mar. 22, 2012, under International Publication No. WO 2012/035252 A1 and the disclosure of which is incorporated herein by reference.

BACKGROUND OF THE INVENTION

The present invention relates to the control of the propagation of elastic waves such as vibrations, notably in the fields of mechanics and of geology. In particular, the present invention relates to the bending of transversal elastic waves propagating in a thin plate.

Significant progress has recently been made in the control of electromagnetic waves. Transformations based upon Maxwell's equations in a cylindrical coordinate system allow structures to be defined for bending electromagnetic waves around a region to hide. Such a structure, which may also be termed an "invisibility cloak", is a metamaterial having a permeability and a permittivity that are strongly heterogeneous and anisotropic and allow the electromagnetic waves to bend around the region to hide. The term metamaterial here designates an artificial composite material having physical properties that are not found in a natural material. The permeability and the permittivity of the metamaterial may be deduced from a transformation of a coordinate system of Maxwell's equations.

United States Patent Application Publication No. 2008/0024792 discloses a geometric transformation allowing for the definition of an invisibility cloak with respect to light. This geometric transformation leads to permittivity and permeability tensors, anisotropic and varying in space, that may be approximated with the aid of a periodic structure comprising structural elements such as "split ring resonators" or in the form of a "Swiss Roll". The invisibility properties of this structure are based on the resonance of the structural elements, and therefore act intrinsically in a specific frequency range.

United States Patent Application Publication No. 2008/0165442 uses the same geometric transformation as that of the application US 2008/0024792, but proposes to approximate the permittivity and permeability tensors with the aid of other structural elements having a fixed permeability, and presenting the shape of metallic lengthened ellipsoids.

United States Patent Application Publication No. 2009/0218523 proposes the use of gradient index materials to approximate the permittivity and permeability tensors.

Contrary to Maxwell's equations and as described in the previously-mentioned documents, Navier equations describe the propagation of elastic waves that do not remain invariable with respect to geometric transformations of the coordinate system. It turns out that such geometric transformations are not applicable to Navier equations. Nevertheless, in a cylindrical coordinate system, equations relating to waves transversal to their propagation plane appear to be unrelated to equations concerning longitudinal and shear waves situated in the propagation plane to which they remain associated.

Document [1] "Achieving control of in-plane elastic waves", M. Brun, S. Guenneau, and A. B. Movchan, Applied Physics Letters 94, 061903 (2009), describes a cylindrical structure adapted to elastic waves situated in their propagation plane. The propagation of these waves is described by a $4^{th}$ rank (non-symmetric) elasticity tensor with $2^4$ Cartesian inputs and an isotropic density. This document shows that the required properties of a metamaterial for bending elastic waves around a cylindrical zone require the intervention of a $4^{th}$ rank elastic tensor and $3^4$ Cartesian inputs variable in space. Nevertheless, in the particular case of a thin plate, that is to say having a large length and width with respect to its thickness, the elastic tensor may be represented in a cylindrical coordinate system by a diagonal matrix with two inputs variable in space.

Document [2] "Ultrabroadband Elastic Cloaking in Thin Plates", M. Farhat, S. Guenneau, S. Enoch, Physical Review Letters, PRL 103, 024301(2009) describes an anisotropic heterogeneous structure for bending transversal elastic waves around a zone to protect of a thin plate. This structure is formed by a plurality of radially symmetric layers, each having a Young's modulus and a constant mass density. To determine the behavior of this structure in relation to elastic waves to be controlled, the wavelength of the elastic waves was considered to be very large with respect to the thickness of the plate and small with respect to the other dimensions of the plate, which allows the von Karman Theory hypotheses to be adopted ("Theory of plates and shells", S. Timoshenko, McGraw-Hill, New York, 1940, and "Wave motion in elastic solids", K. F. Graff, Dover, N.Y., 1975).

In a cylindrical coordinate system, a displacement u(0, 0, U(r,θ)) of the plate in a direction x3 perpendicular to the plane of the plate is a solution of the following differential equation:

$$\lambda \nabla \cdot \{\zeta^{-1} \nabla [\lambda \nabla \cdot (\zeta^{-1} \nabla U)]\} - \beta_0^4 U = 0 \quad (1)$$

in a zone protected by the annular structure formed in the plate, centered at the coordinate origin. In equation (1):
$\lambda = \rho^{1/2}(r)$, $\rho$ being the mass density of the annular structure,
$\zeta$ is equal to $E^{-1/2}$, E being a Young's modulus of the material of the plate,
$\nabla$ is the nabla operator in cylindrical coordinate $$\left( \partial/\partial r, \frac{1}{r} \partial/\partial \theta \right), \text{ and}$$

$\beta_0^4 = \omega^2 \rho_0 h / D_0$, $\omega$ being the pulsation of elastic waves, $\rho_0$ being the mass density of the material constituting the plate, h being the thickness of the plate, and $D_0$ being the flexural rigidity of the plate.

The following coordinate transformation is then applied:

$$r' = a + r(1 - a/b) \quad (2)$$

wherein a and b are the interior and exterior radii of the annular structure centered on the coordinate origin. This transformation allows for compression of the region such that r<a in the ring (a<r<b). It results that by choosing a plate having a constant mass density, for example $\rho_0 = 1$, the Young's modulus and the mass density components of the structure have the following values:

$$E_r = \left( \frac{b}{b-a} \right)^4 \left( \frac{r-a}{r} \right)^4, \quad (3)$$

-continued $$E_\theta = \left(\frac{b}{b-a}\right)^4 \text{ and } \rho = \left(\frac{b}{b-a}\right)^4 \left(\frac{r-a}{r}\right)^2$$

r being comprised between a and b.

The annular structure thus presents an anisotropic Young's modulus E and an isotropic mass density ρ, E and ρ varying as functions of the radius only.

In document [2], the ideal structure defined by equations (3) is approximated by a structure formed by several concentric annular layers having Young's moduli respectively increasing from the interior layer towards the exterior layer. Nevertheless, a structure formed of several concentric annular layers having different Young's moduli is rather difficult to implement, since to get as close as possible to the ideal structure, the number of layers must be as high as possible.

It is therefore desired to define a structure for bending the transversal elastic waves propagating in a thin plate that is easy to fabricate.

BRIEF SUMMARY OF THE INVENTION

Embodiments of the invention relate to a process for bending transversal elastic waves around a zone to isolate of a plate, including forming, around the zone to isolate, a structure presenting an anisotropic Young's modulus and/or heterogeneous mass density, the wavelengths of the elastic waves to bend being large with respect to the thickness of the plate and small with respect to the other dimensions of the plate, wherein the process further includes defining a meshing of a peripheral zone surrounding the zone to isolate; dividing the peripheral zone into several elementary rings centered on the zone to isolate and into several elementary angular sectors having as their origin a point of the zone to isolate; and forming, in each mesh delimited by an elementary angular sector and an elementary ring, a structural element in a material having a Young's modulus and/or a mass density different than those of the material forming the plate, the dimensions of the meshes and of the structural elements in the plane of the plate being less than half the wavelength of the elastic waves to bend.

According to one embodiment, the ratio between the surfaces in the plane of the plate of each of the structural elements and of a mesh in which the structural element is formed is essentially constant for each of the meshes of the structure.

According to one embodiment, each of the structural elements is made by making a perforation in the plate.

According to one embodiment, each of the structural elements is made by filling the perforation with a material having a Young's modulus and/or a density different than those of the material forming the plate.

According to one embodiment, all the structural elements of the structure are made of a same material.

Embodiments of the invention also relate to a structure for bending transversal elastic waves around a zone to isolate of a plate, having an anisotropic Young's modulus and/or a heterogeneous mass density, wherein the structure is obtained by the process as disclosed above.

According to one embodiment, each of the structural elements is a perforation formed in the plate.

According to one embodiment, the structural elements are in a solid material having a Young's modulus and/or a mass density different than those of the plate.

According to one embodiment, the structural elements are made of one or another of two materials having different Young's moduli and/or densities, and are arranged in an alternating manner following each elementary ring and/or following each elementary angular sector.

According to one embodiment, the structure has a circular form and the structural elements are arranged in meshes of a meshing including 6 to 11 concentric elementary rings and 15 to 50 elementary angular sectors centered on the center of the elementary rings.

According to one embodiment, wherein the structure has a circular form having an exterior radius comprised between 1 and 1.5 times the wavelengths of the elastic waves to bend.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 shows a meshing of a zone in which is formed the annular structure, FIG. 2A shows a mesh of the meshing in which is formed a structural element.

DETAILED DESCRIPTION OF THE INVENTION

In the following, "annular structure" or "ring" should be understood as meaning a volume delimited by two cylindrical surfaces included one within the other, and by two parallel planes corresponding to the surfaces of the plate and perpendicular to the cylindrical surfaces. "Cylindrical surface", should be understood as meaning a surface generated by a straight line, called "generatrix", moving along a closed curve called "directrix", while keeping a fixed direction.

To define a structure for bending transversal elastic waves propagating in a thin plate around a zone to isolate, the following hypotheses are assumed:

the structure formed in the plate has an annular form, that is to say, cylindrical with a right angle in the form of a circular crown surrounding the zone to isolate, and the wavelength(s) of the elastic waves to bend is large with respect to the thickness of the plate in which the annular structure is formed and small with respect to the other dimensions of the plate.

These hypotheses allow the Von Karman theory to be applied. On the interior of the zone to isolate, the displacement $u_h(0, 0, U_h(r,\theta))$—in cylindrical coordinates r, θ, z—under the effect of an elastic wave of a point of the plate in a direction z perpendicular to the plate, is a solution of the following differential equation:

$$\lambda_h \nabla \cdot \{\zeta_h^{-1} \nabla [\lambda_h \nabla \cdot (\zeta_h^{-1} \nabla U_h)]\} - \beta_0^4 U_h = 0 \quad (4)$$

the coordinate origin being situated at the center of the zone protected by the annular structure formed in the plate. In equation (4):

$\zeta_h$ is a $2^{nd}$ rank tensor of the same physical dimensions as $E^{-1/2}(r)$ and of which the diagonal coefficients $\zeta_r$ and $\zeta_\theta$ allow the behavior to approach that imposed by the equations (3) to the homogenized anisotropic Young's modulus E(r) in the plane of the plate of the annular structure, $\lambda_h = \int_0^1 \rho^{1/2} r dr$, ρ being the density of the annular structure defined as a function of the variable r, ∇ is the nabla or differential operator in cylindrical coordinates $$\left( \frac{\partial}{\partial r}, \frac{1}{r} \frac{\partial}{\partial \theta} \right),$$

$U_h$ is a solution of equation (4), and $\beta_0^4 = \omega^2 \rho_0 e / D_0$, ω being the pulsation of elastic waves, $\rho_0$ being the density of the material constituting the plate, e being the thickness of the plate, and $D_0$ being the flexural rigidity of the plate.

When the elastic waves penetrate the annular structure, they undergo rapid periodic undulations. To filter these undulations, the displacement $U_h$ solution of equation (4) may be represented in a macroscopic manner by the variable $x=(r, \theta)$.

The homogenized annular structure is not only anisotropic, but also presents a Young's modulus and a density varying spatially as a function of the radius r.

Figure 1A:
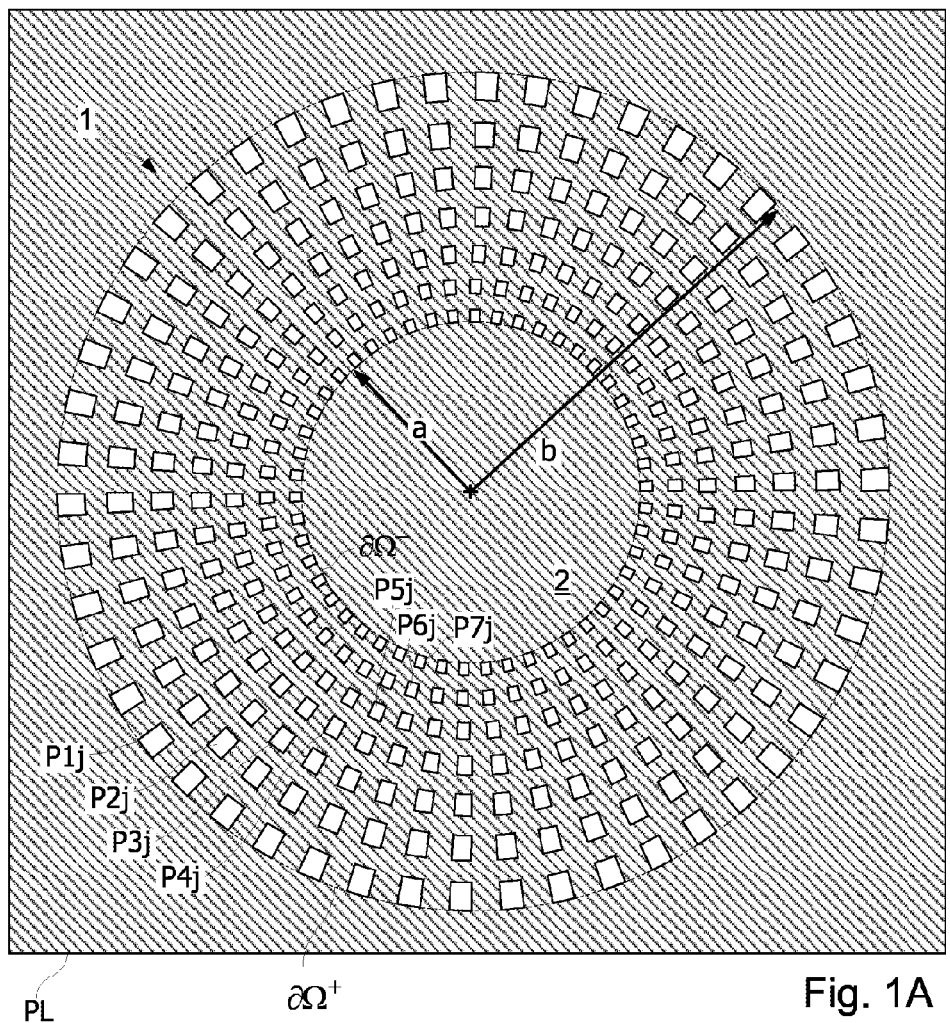
FIG. 1A shows a top view of an annular structure for bending elastic waves around a zone to isolate, according to an embodiment.
Figure 1B:
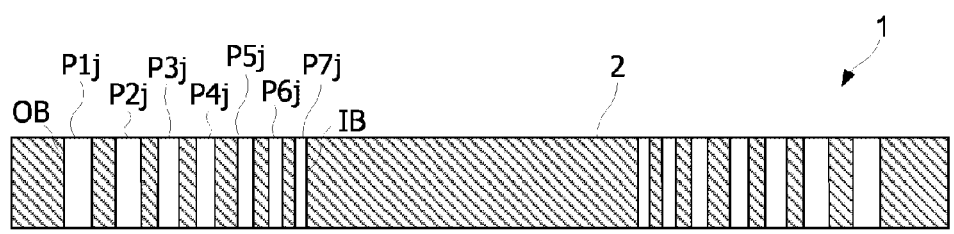
FIG. 1B is a cross-sectional view of the annular structure of FIG. 1A.

FIGS. 1A, 1B show a plate PL having an annular structure 1 surrounding a zone to isolate 2 of the plate PL. The structure 1 includes a plurality of structural elements Pij distributed throughout the concentric rings surrounding the zone to isolate 2 of the plate PL. In the example of FIGS. 1A and 1B, the structure comprises 350 structural elements Pij distributed throughout 7 circular concentric rings (i being comprised between 1 and 7 and j being comprised between 1 and 50). Each of the structural elements Pij presents a straight section in the form of an annular sector, and extends perpendicularly to the plane of the plate PL.

In one embodiment, each of the structural elements Pij includes a perforation of the plate PL. The perforations are done perpendicularly to the plane of the plate PL.

The annular structure 1 may be formed by defining a meshing of an annular peripheral zone PH surrounding the zone to isolate 2 of the plate. Such a meshing is shown in FIG. 2. The peripheral zone PH may be defined, within a range of polar coordinates (O, r, θ) in the plane of the plate centered on the center O of the zone to isolate 2, by the ensemble of coordinate points (r, θ) such that r is comprised between the interior radius R1 and the exterior radius R2 of the zone PH. The meshing is defined by dividing the zone PH into several elementary rings Ai centered on the center O of the zone to isolate 2 and into a plurality of elementary angular sectors Sj having the center O as the origin. The meshing also includes a plurality of meshes Mij in the form of an angular sector, each mesh Mij being delimited by an elementary angular sector Sj and by an elementary ring Aj. The annular structure 1 may then be realized by forming, within each mesh Mij, a structural element Pij of a material having a Young's modulus and/or a mass density different than those of the material forming the plate PL. A mesh Mij having a structural element Pij is shown in FIG. 2A. The dimensions (in the plane of the plate PL) of meshes Mij and of structural elements Pij may be less than half the wavelengths of elastic waves to bend.

In one embodiment, the ratio between the surfaces in the plane of the plate (PL) of each of the structural elements Pij and of the mesh Mij in which the structural element is formed is substantially constant (within 10%) for all the meshes of the structure 1.

It may be shown that the features of structure 1 tend towards those of an ideal structure defined by the equations (3) when the dimensions of the meshes (Mij) and thus those of the structural elements Pij tend towards 0.

Figure 3:
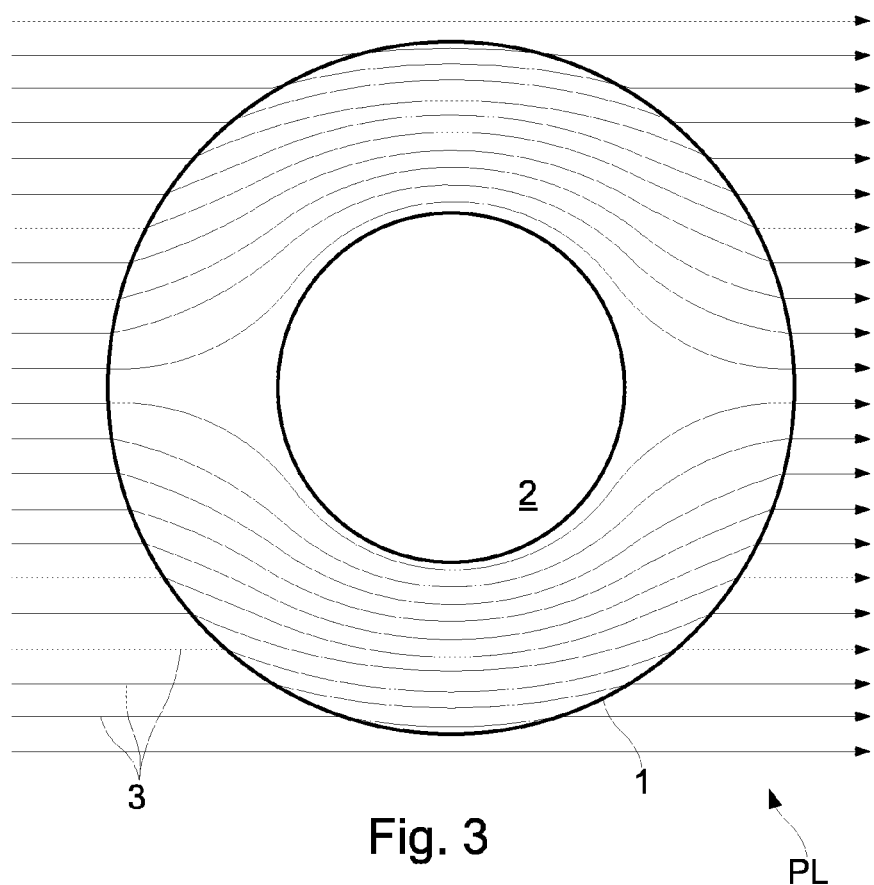
FIG. 3 shows a top view of the annular structure and of propagation paths of transversal elastic waves around the annular structure.

FIG. 3 shows the annular structure 1 formed in the plate PL subjected to transversal elastic waves. FIG. 3 shows propagation trajectories 3 of elastic waves applied to the plate PL. The form of these trajectories 3 shows that the elastic waves reach the structure 1 essentially parallel to each other and leave the structure as if it were not present. In the structure, the elastic waves are diverted by going around the central zone 2.

Figure 4A:
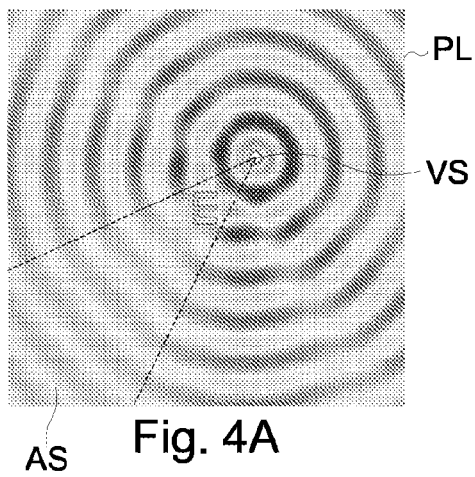
FIGS. 4A, 4B, 4C, 5A, 5B, 5C, 6A, 6B, 6C, 7A, 7B, 7C show the real parts of a field of elastic waves, for four different wavelengths, in the absence of and in the presence of the annular structure, and for two different dimensions of structural elements of the structure.
Figure 5A:
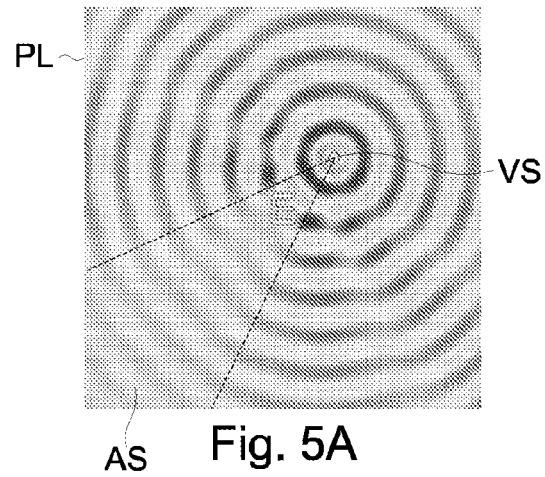
Figure 4B:
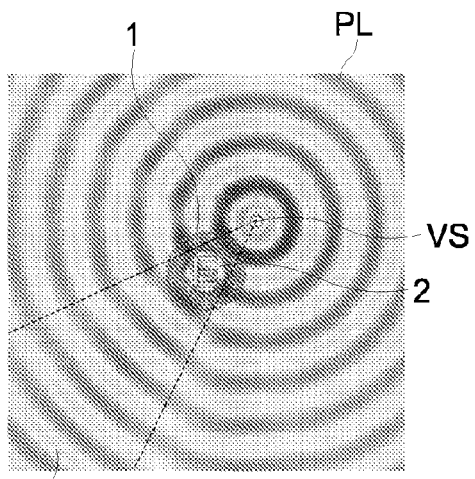
Figure 5B:
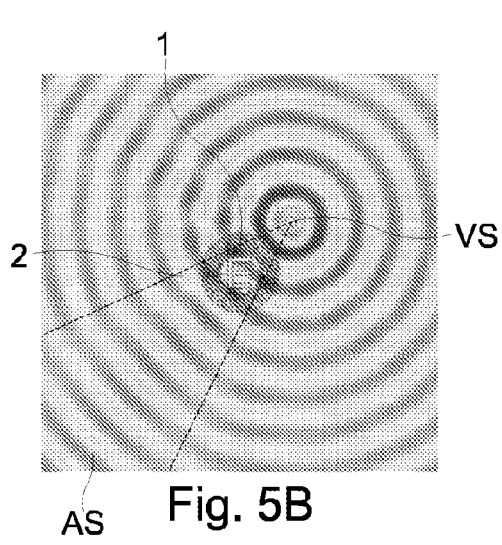
Figure 4C:
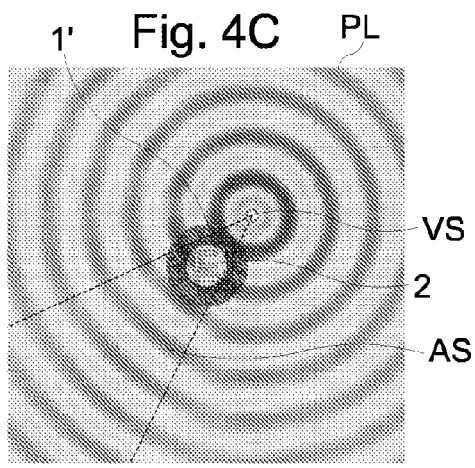
Figure 5C:
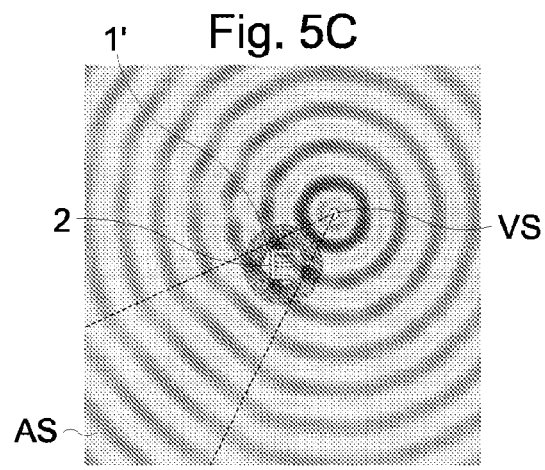
Figure 6A:
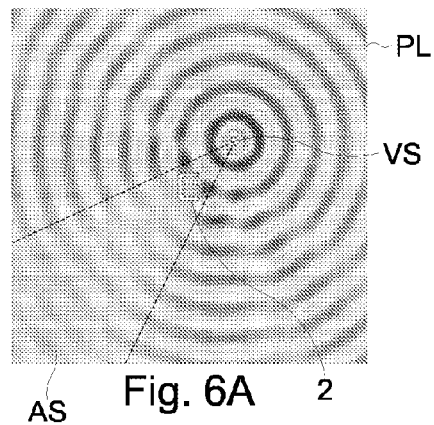
Figure 7A:
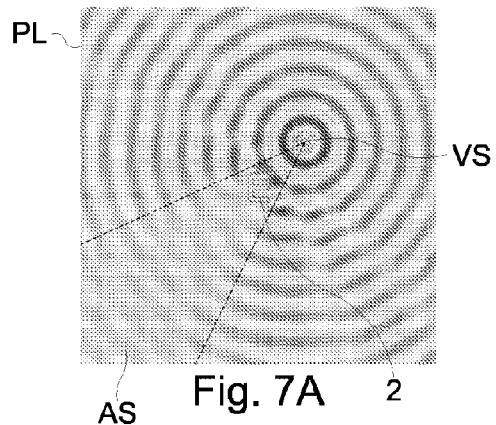
Figure 6B:
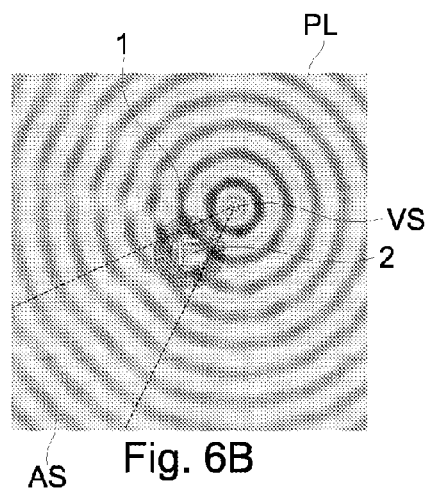
Figure 7B:
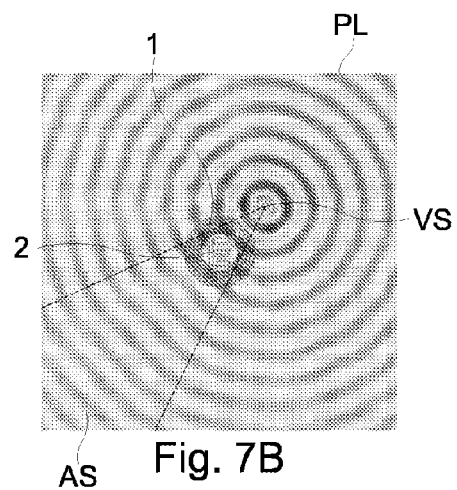
Figure 6C:
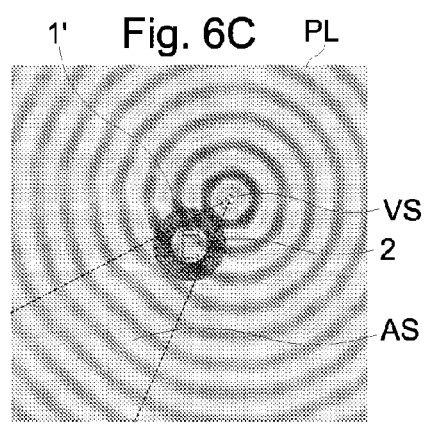
Figure 7C:
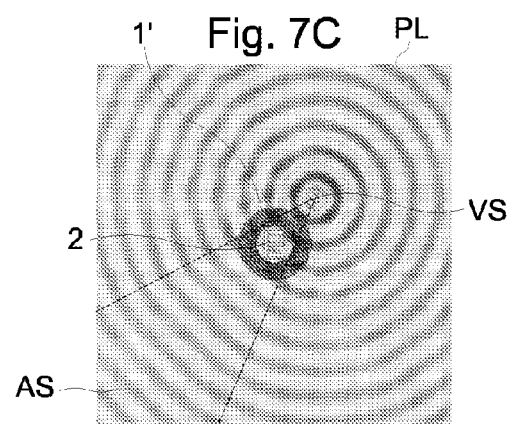

FIGS. 4A to 7C show the plate PL with a zone in the shape of an E fixed at its center. These figures further show the distribution, over the surface of the plate PL, of the real part of a displacement U of the plate perpendicular to the plate, under the effect of elastic waves emitted by a source VS at a point on the plate with Cartesian coordinates (0.5, 0.5) (in unit lengths—u.l.). In FIGS. 4A to 4C, the elastic waves have a wavelength of 0.42 u.l. In FIGS. 5A to 5C, the elastic waves have a wavelength of 0.36 u.l. In FIGS. 6A to 6C, the elastic waves have a wavelength of 0.31 u.l. In FIGS. 7A to 7C, the elastic waves have a wavelength of 0.28 u.l.

In FIGS. 4A, 5A, 6A, and 7A, the plate PL does not have an annular structure for bending elastic waves. It may be noted that in a direction opposite the fixed center of the plate, the waves propagate freely from the source VS in the form of concentric circular waves centered on the source VS. The waves appear to be attenuated in a zone AS of an angular sector issuing from the source VS and of a minimum width including the fixed central zone E. The zone AS and the source VS are situated on opposite sides of the zone E. In the zone AS, the fixed zone E thus produces a "masking" effect of waves. The waves appear to be deformed and slightly attenuated on both sides of the zone AS and in essentially opposite directions. In FIGS. 4B, 4C, 5B, 5C, 6B, 6C, 7B, and 7C, an annular structure 1 of interior radius a=0.2 u.l. is formed around the zone E. Zone E thus finds itself within the central zone 2 of the structure. In FIGS. 4B, 5B, 6B, and 7B, the structure presents an exterior radius b=0.39 u.l. and comprises approximately 100 perforations distributed throughout 6 elementary concentric rings, that is 16 or 17 perforations per elementary ring. In FIGS. 4C, 5C, 6C, and 7C, the structure has an exterior radius of b=0.4 u.l. and comprises approximately 200 perforations distributed throughout 11 elementary concentric rings, that is 18 or 19 perforations per elementary ring.

FIGS. 4B, 4C, 5B, 5C, 6B, 6C, 7B, and 7C show that thanks to the structure 1, the masking effect produced by the zone E in the zone AS has almost disappeared. Only a few deformations remain of the circular form of the waves. These deformations are also attenuated with respect to the deformations seen in FIGS. 4A, 5A, 6A, and 7A in the absence of structure 1, and are found to be partially due to phase differences resulting from the fact that the traversal waves going around the central part 2 of the structure have lengthened trajectories with respect to waves not traversing this structure. Moreover, the deformations of the circular form of the waves appear to be slightly more attenuated in FIGS. 4C, 5C, 6C, and 7C than in FIGS. 4B, 5B, 6B, and 7B. Therefore, the structure more efficiently bends the elastic waves by increasing its number of elements, and thus by decreasing the size of these elements. It may also be observed that the effects of the presence of the fixed zone E are found to be mostly masked by the structure 1, with respect to elastic waves of which the wavelength is between essentially 1 (FIGS. 4A-4C) and 0.7 (FIGS. 7A, 7C) times the exterior radius b of the structure 1. In other words, the exterior radius b of the structure 1 may be comprised between 1 and 1.5 times the wavelengths of the elastic waves to bend.

Figure 8A:
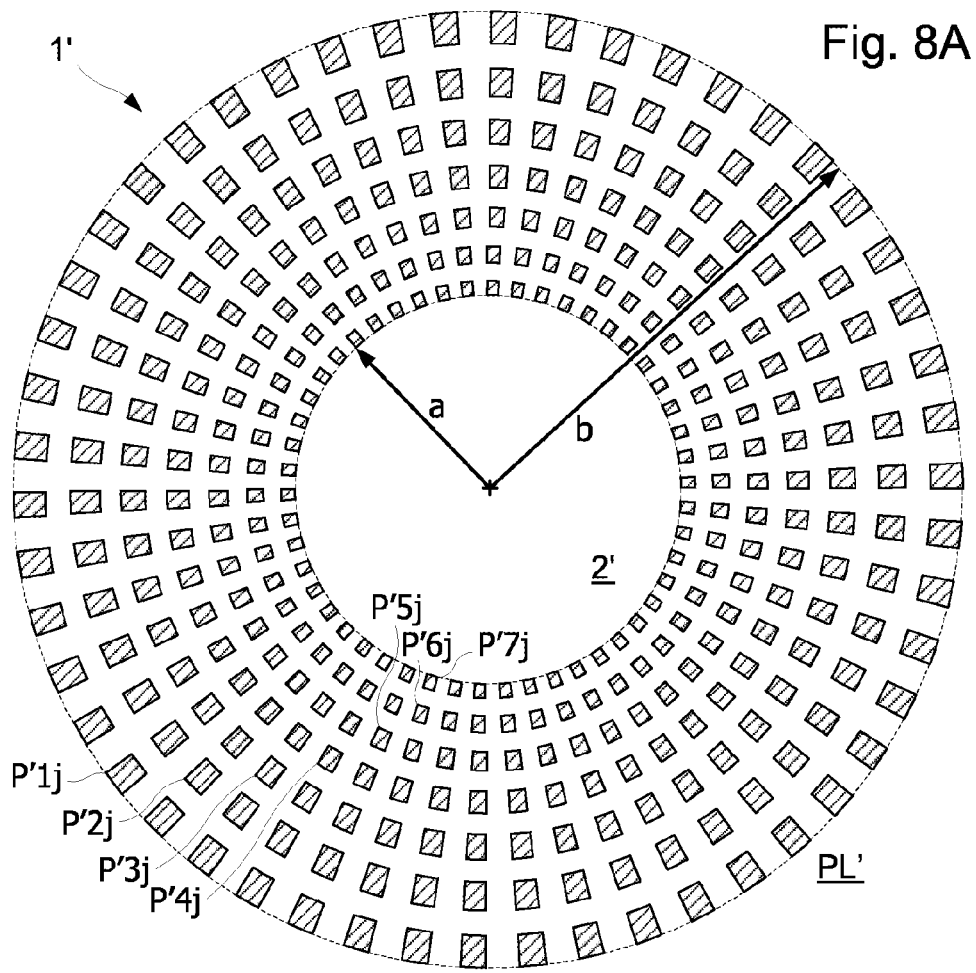
FIG. 8A shows a top view of an annular structure for bending elastic waves around a zone to isolate, according to another embodiment.
Figure 8B:
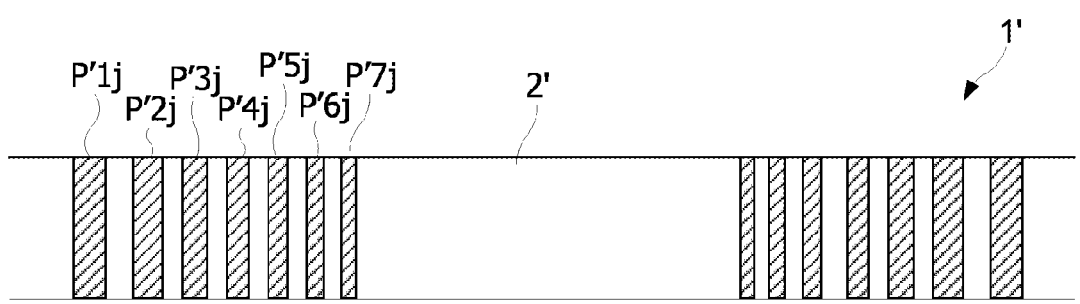
FIG. 8B is a cross-sectional view of the annular structure of FIG. 8A.

FIGS. 8A and 8B show a structure 1' for bending elastic waves around a zone 2' of a plate PL', according to another embodiment. The structure 1' differs from the structure 1 in that the perforations Pij are replaced by plugs P'ij that are inserted in the plate PL' around the zone 2'. The plugs P'ij may be made by forming perforations in the plate PL' and by filling the perforations with a material having a Young's modulus and/or a mass density different than those of the plate. The structure 1' has essentially the same properties as the structure 1 with respect to transversal elastic waves.

The present invention applies in particular to mechanical systems wherein an ensemble must be isolated from another ensemble subjected to vibrations. To this end, one or more contact zones between the two ensembles may be isolated from the other(s) by a structure such as that shown in FIGS. 1A, 1B. The plates in which the structures are formed may be metallic or non-metallic. The perforations Pij may be filled with a material distinct from the material forming the plate. By "material distinct", it should be understood to include a material presenting a density and/or a Young's modulus distinct from those of the plate.

The present invention also relates to the protection of buildings from seismic waves. To this end, one or more buildings may be surrounded by a structure such as that shown in FIGS. 8A, 8B wherein the plugs may be made for example of concrete and driven into the ground. A seismic protection structure for buildings may also be made by a plate in concrete for example, comprising perforations such as shown in FIGS. 1A, 1B.

It will clearly appear to the skilled person that the present invention is susceptible of diverse implementation variations and applications. In particular, the annular structure of the invention is not necessarily a structure having a cross-section in the form of a circular ring. The cross-section of the structure may have other forms or shapes such as an elliptical ring, or a form delimited by two nested rectangles of which the large sides (or small sides) are parallel. It simply matters that the cross-section of the structure has a symmetry such that a reference of coordinates exists wherein the each of the points of the structure has independent coordinates. Similarly, the elements of the structure may have a form corresponding to a division of the structure following two chosen coordinates. In a structure with a rectangular cross-section, the chosen coordinates are Cartesian coordinates and the elements of the structure are of rectangular cross-section.

Furthermore, the structural elements Pij may be made of several solid or liquid materials having different Young's moduli and/or densities. For example, the annular structure may comprises structural elements Pij made in one or another of two different materials, and arranged in an alternating manner following each elementary ring Ai and/or following each elementary angular sector Sj.

It is also not necessary that the elementary rings Ai be concentric or of constant length, nor that the elementary angular sectors Sj are of identical lengths or issuing from the same point. These features were simply assumed for simplification of the modeling calculations, but do not have to be followed in an embodiment of a structure according to the invention. It only matters that the interior and exterior contours of each of the rings Ai are centered in the zone to isolate 2, that the sectors Sj are issuing from a point of the zone 2, and that the dimensions of meshes thus formed are less than half the wavelength(s) of the elastic waves to bend.

In any case, the skilled person may, by using simple simulations, test the efficiency of a particular structure for bending elastic waves over a given range of wavelengths.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for bending transversal elastic waves travelling through a plate, around a zone to isolate of the plate, the plate being made in a solid material and having a thickness small with respect to wavelengths of the elastic waves to bend, the method comprising:
    defining a meshing of a peripheral zone of the plate, the peripheral zone surrounding the zone to isolate, the meshing being defined by:
        dividing the peripheral zone into several elementary rings centered on the zone to isolate and into several elementary angular sectors having an origin located in the zone to isolate; and
        forming in the plate, in each mesh of the meshing, delimited by an elementary angular sector and two adjacent elementary rings, a structural element having a Young's modulus or a mass density different than those of the material forming the plate, the meshes and the structural elements having dimensions in a plane of the plate smaller than half the wavelengths of the elastic waves to bend, the plate and the structural elements forming in the peripheral zone a structure having an anisotropic Young's modulus or heterogeneous mass density.

2. The method according to claim 1, wherein a ratio between surfaces in a plane of the plate of each of the structural elements and of a mesh in which the structural element is formed is essentially constant for each of the meshes of the structure.

3. The method according to claim 1, wherein each of the structural elements is made by making a perforation in the plate.

4. The method according to claim 3, wherein each of the structural elements is made by filling the perforation with a material having a Young's modulus or a density different than those of the material forming the plate.

5. The method according to claim 1, wherein all the structural elements of the structure are made of a same material.

6. The method according to claim 1, wherein the structural elements are made of one or another of two materials having different Young's moduli or densities, and are arranged in an alternating manner following each elementary ring or following each elementary angular sector.

7. A structure formed in a plate made in solid material, for bending transversal elastic waves travelling through the plate, around a zone to isolate of the plate, the plate having a thickness small with respect to wavelengths of the elastic waves to bend, the structure being formed in a peripheral zone of the plate, surrounding the zone to isolate, and having an anisotropic Young's modulus or a heterogeneous mass density, the structure comprising:

a meshing comprising a plurality of meshes formed by dividing the peripheral zone of the plate into several elementary rings centered on the zone to isolate and into several elementary angular sectors having an origin located in the zone to isolate, each mesh being delimited by one of the elementary angular sectors and two adjacent elementary rings of the elementary rings; and a structural element formed in each mesh in the plate, and having a Young's modulus or a mass density different than those of the material forming the plate, the meshes and the structural elements having dimensions in a plane of the plate smaller than half the wavelengths of the elastic waves to bend.

8. The structure according to claim 7, wherein each of the structural elements is a perforation formed in the plate.

9. The structure according to claim 7, wherein the structural elements are made in a solid material having a Young's modulus or a mass density different than those of the plate.

10. The structure according to claim 7, wherein the structural elements are made of one or another of two materials having different Young's moduli or densities, and are arranged in an alternating manner following each elementary ring or following each elementary angular sector.

11. The structure according to claim 7, wherein the structure has a circular form and wherein the structural elements are arranged in meshes of a meshing comprising 6 to 11 concentric elementary rings and 15 to 50 elementary angular sectors centered on the center of the elementary rings.

12. The structure according to claim 7, wherein the structure has a circular form having an exterior radius comprised between 1 and 1.5 times the wavelengths of the elastic waves to bend.

* * * * *